J. A. WESENER.
PRESSURE GAGE.
APPLICATION FILED MAY 2, 1914.

1,143,338.

Patented June 15, 1915.

WITNESSES:
H. M. Gillespie
J. B. Lagorio Jr.

INVENTOR.
John A. Wesener
BY Barnett Truman
ATTORNEYS.

UNITED STATES PATENT OFFICE.

JOHN A. WESENER, OF CHICAGO, ILLINOIS.

PRESSURE-GAGE.

1,143,338.   Specification of Letters Patent.   Patented June 15, 1915.

Original application filed March 6, 1913, Serial No. 752,400. Divided and this application filed May 2, 1914. Serial No. 836,722.

*To all whom it may concern:*

Be it known that I, JOHN A. WESENER, a citizen of the United States, residing at Chicago, in the county of Cook and State of Illinois, have invented certain new and useful Improvements in Pressure-Gages, of which the following is a specification.

My invention relates to pressure gages in which the indicating mechanism is actuated by flexible diaphragm; and the invention has for its primary object to provide a pressure gage of this type having certain novel constructions and arrangements whereby it may be employed for indicating the pressure of a gas used for the maturing and bleaching of flour, such as chlorin, nitrosyl chlorid, or other gas having similar properties; the gage being primarily intended to form a part of a flour treating apparatus such as that disclosed in my co-pending application Serial No. 752,400 filed March 6, 1913. The gases used for the maturing and bleaching of flour, such as chlorin, nitrosyl chlorid or a mixture of these gases, are very corrosive in their action upon some metals, for example, on steel, under certain conditions which cannot be always wholly controlled, for instance, if there is any appreciable amount of moisture in the gas. This makes the ordinary flexible diaphragm gage unsuitable for use in flour treating apparatus. On the other hand, it is essential to the proper treatment of the flour that the amount of the gas be accurately controlled which necessitates a mechanism for indicating the pressure in the gas conduit which will be very accurate, reliable and sensitive in its operation. This is particularly so inasmuch as the pressures handled are comparatively low.

I have overcome the difficulty involved by certain novel improvements in the construction of a pressure gage of the flexible diaphragm type whereby the steel diaphragm which actuates the indicating mechanism is protected from contact with the gas without, however, impairing the sensitiveness of the device to minute changes in pressure.

This application is a division of my application Serial No. 752,400 above referred to.

The invention is illustrated, in a preferred embodiment, in the accompanying drawing wherein—

Figure 1:
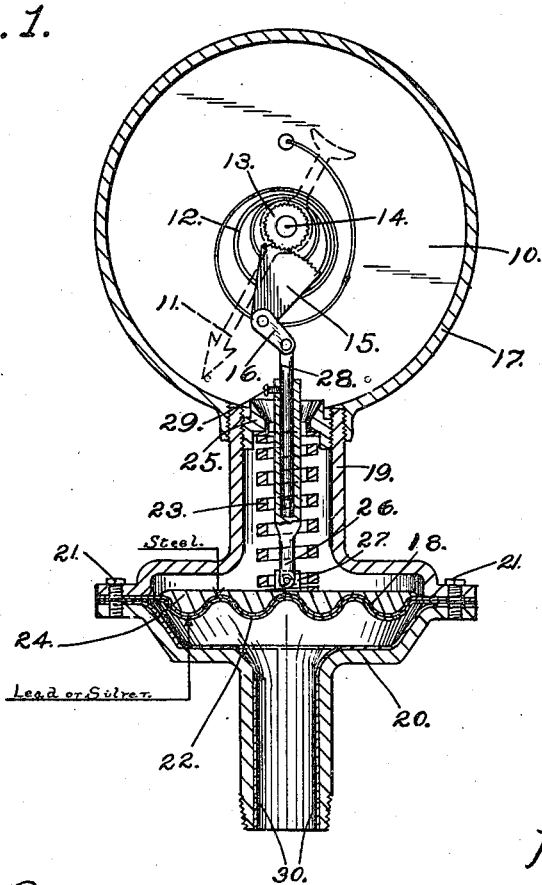
Figure 3:
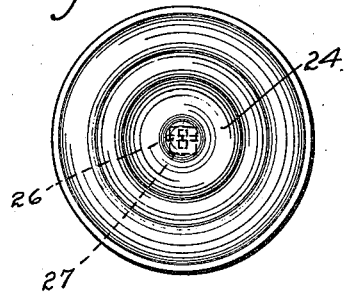
Figure 2:
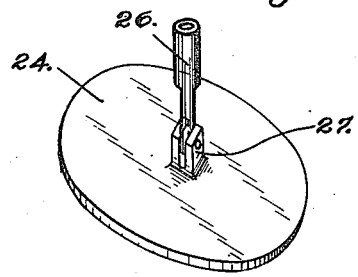

Figure 1 is a longitudinal sectional view of the device, the section passing through the dial casing back of the dial, Fig. 2, a view, in perspective, of the abutment disk showing the connection of the pointer operating rod therewith, and Fig. 3, an inverted plan view of the disk.

Like characters of reference indicate like parts in the several figures of the drawing.

Referring to the drawing, 10 designates the dial of the gage, the back of which is shown in Fig. 1, 11 the indicating hand or pointer, 12 a coiled spring which moves the hand toward zero mark as the pressure decreases, 13 a gear wheel on the spindle 14 of the dial hand, and 15 a sector gear meshing with the gear 13 and provided with an arm 16; these parts being inclosed in the dial casing 17 and being of familiar construction.

The diaphragm 18 for actuating the indicating mechanism above described is preferably of thin steel formed with the usual concentric corrugations and extends across a diaphragm casing made up preferably of the two casing elements 19 and 20 secured together by screws 21, the margin of the diaphragm 18 intervening between the upper casing 19 and the lower casing 20. To protect the steel diaphragm 18 from the corrosive action of the gas in the pressure chamber constituted by the lower casing element 20, which is secured to the gas supply pipe of the treating apparatus at any suitable point, I provide a lining element or protecting diaphragm 22 preferably made of silver or lead which is arranged on the under side of and in intimate contact with the diaphragm 18 and conforms to the contour thereof in all respects.

Although the protective diaphragm is made as thin as possible it necessarily makes the steel actuating diaphragm 18 more sluggish and insensitive than it would otherwise be. To compensate for this a spring 23 is interposed between the abutment disk 24 which rests on the top of the diaphragm 18 and a nut 25 in the upper end of casing 19. The pressure of the spring may be varied by an adjustment of the nut 25. The lower surface of the abutment plate 24 is concentrically corrugated so as to fit the corrugations of the diaphragm. It is connected with the arm 16 of sector gear 15 by means of a two-part telescopic connecting rod, the lower section 26 of which is pivoted to a clevis 27 on the abutment plate, the upper section 28 being adjustably fixed in the lower section by means of a set screw 29. Preferably the lower diaphragm casing section 20 is provided with a lead or silver lining 30.

The above described arrangements provide a pressure gage which may be used without impairment of its intended function with a very corrosive gas and which is nevertheless extremely sensitive to slight variations in pressure of such gas. The device is also readily adjustable.

I claim:

1. In a pressure gage, the combination with indicating mechanism, of a diaphragm casing, a flexible pressure operated actuating diaphragm for said indicating mechanism which extends across said casing, and a protective diaphragm of non-corrosible material in intimate contact with said flexible diaphragm on the pressure side of the same and having the contour thereof.

2. In a pressure gage the combination with indicating mechanism, of a diaphragm provided with a spring abutment, a flexible pressure operated actuating diaphragm for said indicating mechanism which extends across said casing, a protective diaphragm of non-corrosible material in intimate contact with said flexible diaphragm on the pressure side thereof, and a spring interposed between the other side of said flexible diaphragm and said spring abutment.

3. In a pressure gage, the combination with indicating mechanism, of a diaphragm casing, a flexible pressure operated actuating diaphragm for said indicating mechanism which extends across said casing, a protective diaphragm of non-corrosible material in intimate contact with said flexible diaphragm on the pressure side thereof, an adjustable spring abutment, and a spring interposed between said abutment and the flexible diaphragm on the side of the same opposite the protective diaphragm.

4. In a pressure gage, the combination with indicating mechanism, of a diaphragm casing, a concentrically corrugated steel diaphragm extending across said casing, an abutment disk having a concentrically corrugated surface bearing upon said steel diaphragm, a connecting rod pivoted to said abutment disk and engaged with said indicating mechanism, a spring abutment having a threaded engagement with the diaphragm casing, and a perforation through which said operating rod passes, a spiral spring bearing at one end against said abutment and at the other against said disk, and a protective diaphragm of non-corrosible material in intimate contact with the steel diaphragm on the pressure side of the same and having the contour thereof.

5. A pressure gage comprising a diaphragm having its margin restrained and its central portion free to move under the influence of fluid pressure acting against one side thereof, a spring normally maintaining a tension upon the other side of the diaphragm, a device for indicating variations of pressure, an actuating member operatively connected to said indicating device and having one end loosely engaging said diaphragm upon the side of the tension member, and means for adjusting the tension of said spring independently of said actuating member.

6. A pressure gage comprising a housing, a diaphragm within the housing and having its marginal rim clamped therein, a bearing block carried by said diaphragm, an adjustable spring engaging said block, means for adjusting the tension of said spring, an indicating device, and a spring-pressed stem or rod operatively connected with said indicating device and having one end bearing loosely upon said bearing block.

JOHN A. WESENER.

Witnesses:
L. A. FALKENBERG,
G. Y. SKINNER.